US006463273B1

(12) United States Patent
Day

(10) Patent No.: US 6,463,273 B1
(45) Date of Patent: Oct. 8, 2002

(54) WIRELESS WARNING SYSTEM

(76) Inventor: J. Cameron Day, 2110 Glenridge Ct., Marietta, GA (US) 30062

( * ) Notice: Subject to any disclaimer, the term of this patent is extended or adjusted under 35 U.S.C. 154(b) by 0 days.

(21) Appl. No.: 09/309,528

(22) Filed: May 11, 1999

(51) Int. Cl.[7] .............................................. H04M 11/00

(52) U.S. Cl. ......................... 455/404; 455/456; 379/37; 340/825.37

(58) Field of Search ................................ 455/404, 414, 455/3.06, 456; 340/825.44, 825.54, 825.37, 825.38, 7.1, 7.2, 573.1; 379/37, 49

(56) References Cited

U.S. PATENT DOCUMENTS

| | | | | | |
|---|---|---|---|---|---|
| 3,603,951 | A | | 9/1971 | Bracken et al. | 340/539 |
| 3,753,117 | A | | 8/1973 | Downing et al. | 325/364 |
| 4,153,881 | A | | 5/1979 | Permut et al. | 325/64 |
| 4,155,042 | A | * | 5/1979 | Permut et al. | 455/404 |
| 4,812,825 | A | | 3/1989 | Kennedy et al. | 340/601 |
| 4,887,291 | A | * | 12/1989 | Stillwell | 455/404 |
| 5,278,539 | A | * | 1/1994 | Lauterbach et al. | 340/825.44 |
| 5,444,433 | A | | 8/1995 | Gropper | 340/601 |
| 5,481,254 | A | | 1/1996 | Gaskill et al. | 340/825.52 |
| 5,588,038 | A | | 12/1996 | Snyder | 379/57 |
| 5,628,050 | A | | 5/1997 | McGraw et al. | 455/12.1 |
| 5,742,235 | A | | 4/1998 | Miche' | 340/690 |
| 5,745,849 | A | * | 4/1998 | Britton | 455/404 |
| 5,781,852 | A | | 7/1998 | Gropper | 455/227 |
| 5,923,731 | A | * | 7/1999 | McClure | 455/404 |
| 5,995,553 | A | * | 11/1999 | Crandall et al. | 455/404 |
| 6,112,074 | A | * | 8/2000 | Pinder | 455/404 |
| 6,112,075 | A | * | 8/2000 | Weiser | 455/404 |

FOREIGN PATENT DOCUMENTS

| | | | |
|---|---|---|---|
| DE | 197 20 591 | 11/1998 | G04G/1/00 |
| JP | 10-164634 | 10/1998 | H04Q/7/14 |

* cited by examiner

*Primary Examiner*—William Trost
*Assistant Examiner*—Simon Nguyen
(74) *Attorney, Agent, or Firm*—Bernstein & Associates, P.C.; Jason A. Bernstein

(57) ABSTRACT

A wireless warning system for alerting and advising selected uses of a potential or existing emergency within a predetermined geographic area. The system operates on the principle of a common or party-line pager communication link, where all users within the predetermined geographic area are alerted simultaneously of the emergency situation. When the system is activated a detectable alarm, in the form of an LED readout panel for portable pager receivers, or as an audio or visual alarm for fixed structures, alerts all users in the geographic area.

7 Claims, 2 Drawing Sheets

WIRELESS WARNING SYSTEM

FIELD OF THE INVENTION

The present invention is directed to the field of wireless warning systems for rapidly warning selected system users, via a pager communication link, of various types of emergencies, particularly as a rapid and broad instantaneous system for a group of individual users, where a critical emergency may be a tornado warning or watch.

BACKGROUND OF THE INVENTION

The present invention relates to a system for providing warning information to users, such as to a pager-type system, or similar receiver, where rapidly transmitted emergency information can be critical in helping to avoid a potentially dangerous situation.

Most people today must rely upon the mass media, such as television and radio, to advise them of various emergency situations. These emergency situations vary from daily traffic reports, to more serious situations, such as hurricanes, tornadoes, plane crashes, chemical and plant accidents, etc. Unfortunately, one must be listening or watching to be aware of the specific emergency. Even where the emergency occurs at a fixed facility, such as a plant or prison, one must be within earshot to hear any alarm that may be sounded by the facility.

Despite the strides that have been made by the National Weather Service in determining areas of potential concern for tornadoes, through satellite technology and computer modeling, tornadoes continue to be emergencies that cause unfortunate injury and death throughout the United States and other countries each year. As good as those efforts have been in recent years, the problem exists in notifying the public. Unless one is listening to a radio or television, one might not even be aware of a "watch," much less a "warning." Clearly, when one is asleep, an advanced alert is impossible.

U.S. Pat. No. 5,278,539, to Lauterbach et al., represents a proposed solution to provide an alerting and warning system for alerting or warning large numbers of people of the occurrence or threat of an emergency using available communications media. Multiple facilities are monitored for the occurrence of multiple alarm conditions. On the occurrence of such a condition, radio or telephone contact is made with a Local Emergency Planning Committee (LEPC) and the LEPC is notified of the site and nature of the alarm condition. Using a predetermined listing or data bank the LEPC selects a number corresponding to the site and condition and transmits such number to an automated controller for a radio transmitter. The transmitter may be part of an existing radio paging system. The automated controller, on the basis of the number dialed in by the LEPC, transmits an appropriate Code Assignment plan (Cap Code) signal. The Cap Code signal is the electronic signature of a preprogrammed Cap Code chip within individual radio receivers positioned at the sites of intended alarm recipients. The Cap Codes are individually assigned and utilized to effect the notification of predetermined individuals related to specific alarm conditions. Upon a receiver being actuated by receipt of its Cap Code an alarm is actuated to produce a sensory alarm signal such as sound or light. A detector is provided at the alarm site and upon detecting the sensory alarm acknowledges to the monitored facility the occurrence of the alarm.

There are limitations, however, to the system of Lauterbach et al. The Lauterbach et al. system relies upon individual pager units, with each such unit to be called. That is, whether the pager units are called one by one, or as part of a pre-programmed list that is auto dialed by computer, the system thereof still requires dialing all of the individual numbers of the respective pager units. With electrical power lost, individual dialing would be of no real value as a warning system.

U.S. Pat. No. 5,588,038, to Snyder, teaches a more recent wireless system for communicating with a remote location, such as an automobile. The system thereof includes a calling transceiver, a central transceiver, and a satellite, whereby the calling transceiver and the central transceiver are used to transmit a forward wireless communication over-the-air, through the satellite, and to a pager transceiver located in the remote location in order to control a device located in the remote location. Upon receiving the signal, the pager transceiver generates a first signal, which is received by a tripping circuit, which in turn generates a second signal. The second signal causes a switch to trip, which thereby controls the device located at the remote location. The pager transceiver also has the capacity to transmit reverse wireless communications through the satellite, which allows monitoring of the device. This is at best an alarm system for tracing a stolen car, for example, but it is not an effective means for alerting a person of an emergency.

The invention hereof is uniquely distinctive by the ability to provide simultaneous emergency warning information to selected users of a wireless pager or related type system, where such information may be rapidly and automatically transmitted to such users within a designated geographic area served by the service provider. The manner by which this invention provides this unique warning alert will become apparent to those skilled in the art from the following description, particularly when read in conjunction with the accompanying drawings.

SUMMARY OF THE INVENTION

The present invention relates to a wireless warning system to alert and advise selected users to potential or existing emergencies within a geographic area covered by a service provider, where the system operates on the principle of a common or party-line pager communication link. The system comprises a user program in which each selected user has a coded party-line number that is activated by an emergency agency to alert said user of the emergency. The service provider, in communication with various emergency detection stations, such as police, fire, weather, etc., receives the emergency information regarding the geographic area for the emergency, and transmits the information simultaneously to all users. By this system the users are quickly advised of an emergency at a location, i.e., permanent home, mobile home, office, or school, or other location as more clearly defined hereafter.

An alternative use of the system hereof may be as a rapid means to simultaneously notify a group of users, such as a group of children at a large theme park, military personnel theater or plant supervisory personnel to assemble at a given location, or the like.

Accordingly, an object of this invention is to provide a system for alerting and advising users thereof of an emergency, when the user does not have the ready convenience of a mass media source of information.

A further object hereof is a warning system that can delineate and accurately define the nature and severity of an emergency.

Another object of this invention lies in the ability to simultaneously alert all users of the system within the geographic area where the emergency is located.

Still another object hereof lies in its use in non-emergency situations, where a selected group of individuals may be alerted simultaneously to assemble at a particular location, such as a group of children at a theme park, or plant officials for an important meeting.

A further object of this invention is a wireless communication system that can utilize conventional wireless receivers or systems, such as pager transmission companies to pager-type receivers, pager units, or fixed alarm devices.

These and other objects will become more apparent to those skilled in the art from the following description, particularly when read in conjunction with the accompanying drawings.

BRIEF DESCRIPTION OF DRAWINGS

The invention is illustrated in the drawings in which like reference characters designate the same or similar parts or features throughout the several views of which.

DETAILED DESCRIPTION OF THE PREFERRED EMBODIMENT

The present invention is directed to a pager-type communication system that operates on the principle of a common coded signal, or party-line, for all users of the system within a prescribed geographic area. Within this mode of operation there are two principal applications for the system: (a) a means to rapidly and simultaneously warn all users thereof of an emergency, such as a tornado watch or warning, and (b) as a means to quickly and simultaneously notify such users of an impending event.

While the first operating mode for the system hereof relies upon a pager service provider, such as a phone company, there would be no user fees to the ultimate user of the service, thus making the system quite unique. If a fee were required, it would be the responsibility of the government agency which would notify the users of an emergency, such as the Emergency Management System (EMS). At best, only a small fee would be required as the system utilizes a common pager number. The signal is a common signal similar to an AM or FM radio signal. As with radio, one does not have to buy air time or subscribe to any service, one simply purchases a radio receiver and can receive all the signals broadcast in the local or geographic area. The pager-type receiver, as employed in this invention, and as explained in more detail hereafter, is similar. That is, one simply purchases a pager-type receiver that is already pre-programmed for the geographic area of concern, such as the purchaser's zip code area, then the unit is mounted on a wall, for example, ready to be activated. This will become clearer in the following description.

Figure 1:
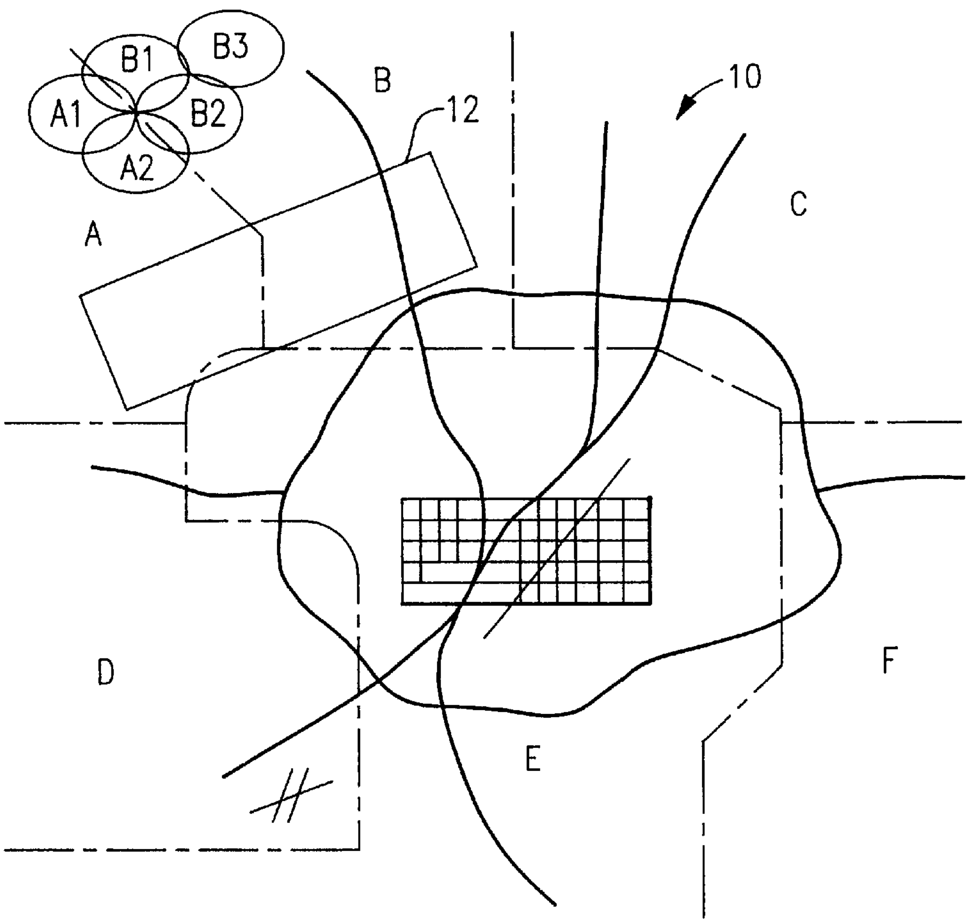
FIG. 1 is a representation of a typical geographic area to be covered by a first operating mode for the wireless warning system of the present invention, where the geographic area may be a series of adjoining zip code areas, as known in the art, within a metropolitan area covered by the system hereof.

Turning now to the drawings, FIG. 1 illustrates at least a portion of an exemplary geographic area 10 that may be applicable to the first operating mode of this invention. Overlaid on the geographic area 10 is an elongated path 12 that may represent the projected path of a tornado, as determined by The National Weather Service and transmitted to the local EMS. It will be understood that the geographic area may be defined differently to more aptly describe the local layout. If zip code areas are too large for a meaningful use of the system hereof, such areas may be subdivided into smaller zones. Alternately, existing county lines may be used.

Figure 2:
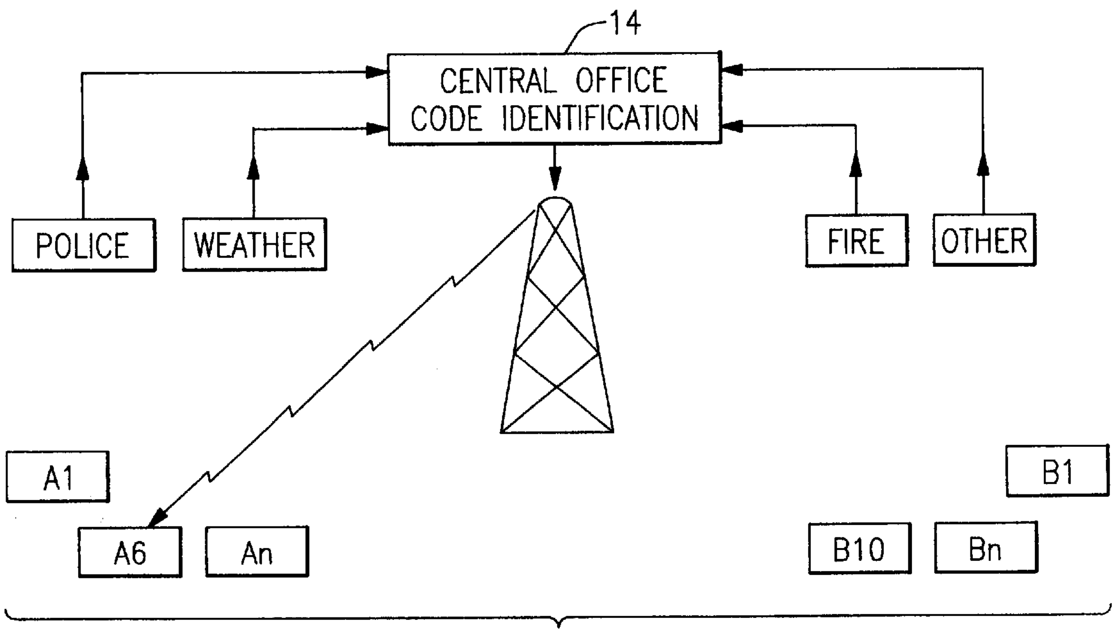
FIG. 2 is a pictorialized diagram of the system of the present invention, illustrating an exemplary first operating mode thereof.
Figure 3:
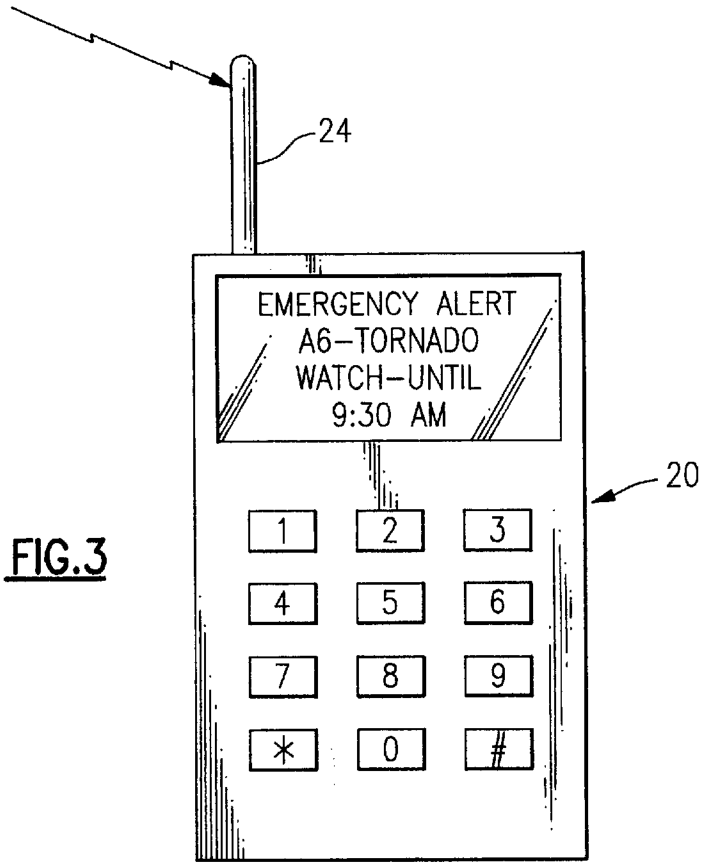
FIG. 3 is a cutaway view of a device for generating a detectable alarm for a fixed structure within an alert of the geographic area, such as a home, school, or occupied public or private building, in response to an electronic signal from an emergency notifier, in accordance with the first operating mode of the present invention.

FIG. 2, in conjunction with FIG. 1, best illustrates the operation of the first operating mode of the system of this invention, whereas FIG. 3 illustrates a preferred pager-type receiver that may be incorporated into said system in fixed structures, such as permanent homes, mobile homes, schools, occupied buildings, etc. Alternatively, instead of a pager a pager/cellular phone or a personal communication system can be used.

The National Weather Service, (NWS) constantly monitors the weather throughout the United States, and is particularly active during hurricane and tornado seasons. Further, the monitoring is particularly refined through years of experience and computer modeling. Despite the technology breakthroughs, tornadoes remain a natural disaster that continue to cause many injuries and fatalities in Southern and Midwestern areas of the United States.

Local EMS agencies, where the numeral 14 designates the EMS for the geographic area 10, are in communication with the NWS. As tornadoes are highly possible a "watch" is noted, such as for the path 12 (FIG. 1), where the EMS may simply dial one or two coded numbers, depending on the coverage area of said path relative to one or two zip code areas, to alert all users (A-1) to (A-n) that a "watch" is in place. Subsequently, if the "watch" has to be upgraded to a "warning," a second coded call will be made to the users (A-1) to (A-n) to alert them that a "warning" is now in place and protective cover is appropriate for everyone at the location. However, since tornadoes can move rapidly, it may be necessary to designate a "watch" for a different zip code area, such as users, (B-1) to (B-n). However, since this can be accomplished by a single coded call, the users are quickly and simultaneously advised of the "swatch."

Since the primary purpose of the first operational mode for the system hereof is to warn and alert people in fixed structures, a conventional and expensive, mobile pager receiver is neither used nor necessary. A feature of the present invention is the provision of an economical receiver that is affordable by most people. One such receiver is illustrated in FIG. 3. The device 20 is sized like a typical "smoke alarm" and may include a pager circuit 22 in communication through an antenna 24 with the service provider, more specifically the EMS, and at least a pair of detectable alarm means. In the embodiment of FIG. 3, one such alarm means may be high level horn 26, i.e., 85 dB, and a flashing light 28. By incorporating plural alarm means, it is possible to readily categorize the nature of an emergency. For example, the light may flash in response to a first coded signal to advise of a tornado "watch", whereas the horn may be sounded as the result of a second coded signal to advise of a tornado "warning", and hence the need to seek protective cover.

Figure 4:
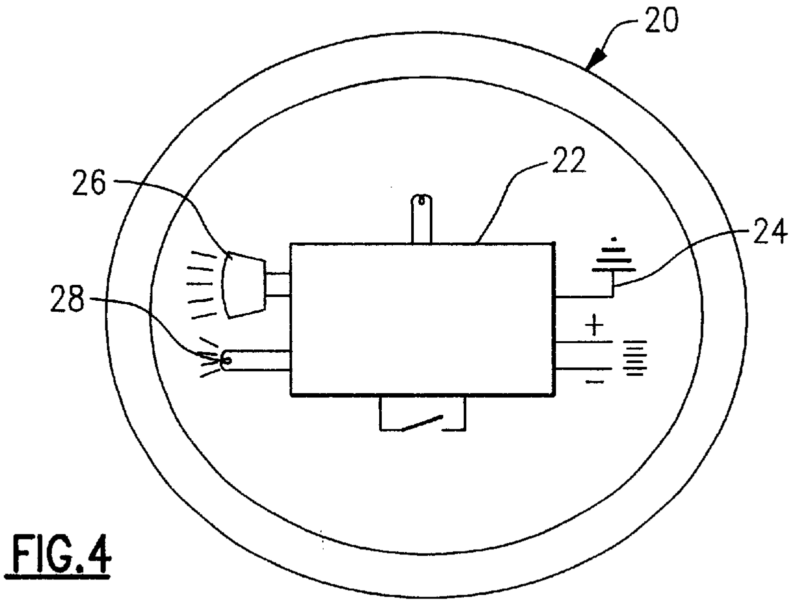
FIG. 4 is a plan view of a typical wireless pager-type receiver, illustrating a detectable alarm in the form of an LCD message on said receiver, in accordance with the second operating mode of the present invention.

The alternate or second operating mode for the system of this invention, while still operating on the principle of a common pager communication link, may be for essentially private use. For example, there may be interest for the system at a theme park, such as Disney World, where it is common for large groups to visit. The group would work in conjunction with the theme park, where the theme park management may provide, on loan, a number of pager receivers to be used by chaperons or subgroup leaders. Each subgroup would be provided a pager receiver, with a common coded number, where the overall group leader, functioning like the EMS in the first operating mode, may simultaneously contact and advise all subgroup leaders, through a pager communication link operated by the theme park, on information pertinent to the full group. The pager receivers, where an exemplary receiver is shown in FIG. 4, may include an LED panel on which the information may appear. The message may be merely a reminder of "lunch" or "departure,", or it may be an emergency situation involving a group member. Particularly in large theme parks, where it may be difficult to keep a large group together, such a system offers a degree of comfort that simultaneous contact with the entire group is possible at all times.

Another area of private interest for the system hereof is as a simultaneous paging system for a large business plant or complex, where it may be necessary to summons key personnel to an important meeting, for example. This system would avoid the need to individually dial and contact the key personnel in question.

Moreover, military, firemen, emergency response teams (e.g., SWAT teams) may all benefit from a simultaneous command signal (e.g., need to retreat/regroup) being sent over a large or small area. The present invention provides a rapid, inexpensive and direct system for achieving this result.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means plus function claims are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

It should further be noted that any patents, applications or publications referred to herein are incorporated by reference in their entirety.

I claim:

1. A one-way wireless pager warning system for alerting and advising selected users of a potential or existing emergency within at least one predetermined geographic area, said system comprising:

a) a distinct common pager communication link communicating with plural pager receivers programmed to a common coded address for each said geographic area;

b) at least one detection station for receiving said information regarding said emergency;

c) a central receiving station for receiving and monitoring said information and identifying at least one said area associated with said emergency;

d) means for selectively and simultaneously transmitting a single coded electronic signal from said central receiving station to all said users within said area, where said users are subscribers to said common pager communication link with the same coded address; and, e) means for generating a detectable alarm in response to said coded electronic signal to said users, where said alarm further categorizes the nature of the emergency.

2. The wireless warning pager system of claim 1, wherein said geographic area may be subdivided into plural zones, with each said zone being individually and uniquely identified by a different specific coded pager communication link.

3. The wireless pager communication system of claim 2, wherein each said pager communication receiver includes the capability for said user to program said receiver to a second precoded address for a second said geographic zone.

4. The wireless warning pager system of claim 1, wherein said emergency may be weather related, and is further categorized into the nature of said emergency.

5. The wireless warning pager system of claim 1, wherein said means for generating said detectable alarm includes a fixed unit having plural alarm systems, where each said alarm system is used to identify a specific emergency.

6. The wireless warning pager system of claim 5, wherein said plural alarm system may include a combination of a combination of a flashing light and an audio sounding means.

7. A wireless pager communication system for simultaneously alerting a selected group of individuals, located within a prescribed geographic area, of an event or emergency within said geographic area, said system comprising:

a) a plurality of pager-type receivers programmed to the same coded address, each said receiver being assigned to a respective said user;

b) an alerting station having a pager communication link to each pager-type receiver, where said pager communication link utilizes a common code for all said receivers;

c) means for activating said pager communication link, through said alerting station, by the selective transmission of a coded electronic signal to all said receivers having the same coded address; and, d) means for generating a detectable notice in all said receivers in response to said coded electronic signal, where said notice identifies said event or emergency.

* * * * *